United States Patent
Souma et al.

(10) Patent No.: US 7,458,735 B2
(45) Date of Patent: Dec. 2, 2008

(54) IMAGE-TAKING LENS UNIT

(75) Inventors: Yoshihito Souma, Sakai (JP); Yasushi Yamamoto, Kishiwada (JP); Tsutomu Honda, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 389 days.

(21) Appl. No.: 11/253,350

(22) Filed: Oct. 19, 2005

(65) Prior Publication Data
US 2006/0280498 A1 Dec. 14, 2006

(30) Foreign Application Priority Data
Jun. 9, 2005 (JP) ............................. 2005-169360

(51) Int. Cl.
*G03B 15/00* (2006.01)
(52) U.S. Cl. ...................... 396/351; 348/308; 348/340; 359/683; 359/726
(58) Field of Classification Search ................ 396/351, 396/21; *G03B 13/00*
See application file for complete search history.

(56) References Cited

U.S. PATENT DOCUMENTS

| | | | | |
|---|---|---|---|---|
| 5,708,857 A | * | 1/1998 | Ishibashi | 396/21 |
| 5,875,059 A | * | 2/1999 | Estelle | 359/682 |
| 6,072,637 A | * | 6/2000 | Okada et al. | 359/676 |
| 6,288,845 B1 | * | 9/2001 | Harada | 359/664 |
| 6,683,298 B1 | * | 1/2004 | Hunter et al. | 250/239 |
| 6,754,446 B2 | * | 6/2004 | Hagimori et al. | 396/72 |
| 6,775,074 B2 | * | 8/2004 | Kasahara | 359/781 |
| 7,113,345 B2 | * | 9/2006 | Mihara et al. | 359/676 |
| 2004/0136086 A1 | * | 7/2004 | Ohtake | 359/687 |

FOREIGN PATENT DOCUMENTS

JP 2003-161878 A 6/2003

* cited by examiner

*Primary Examiner*—Melissa Jan Koval
*Assistant Examiner*—Linda B Smith
(74) *Attorney, Agent, or Firm*—Sidley Austin LLP

(57) ABSTRACT

An image-taking lens unit has an image-taking lens system that forms an optical image of an object and an image sensor that receives the optical image in a rectangular image-sensing region and converts the optical image into an electrical signal. The image-taking lens system includes a reflective optical element that bends the optical path. Of the lens elements constituting the image-taking lens system, the most image-side lens element called the last lens element is molded of resin, and is given a non-circular outer shape fulfilling a prescribed condition.

4 Claims, 9 Drawing Sheets

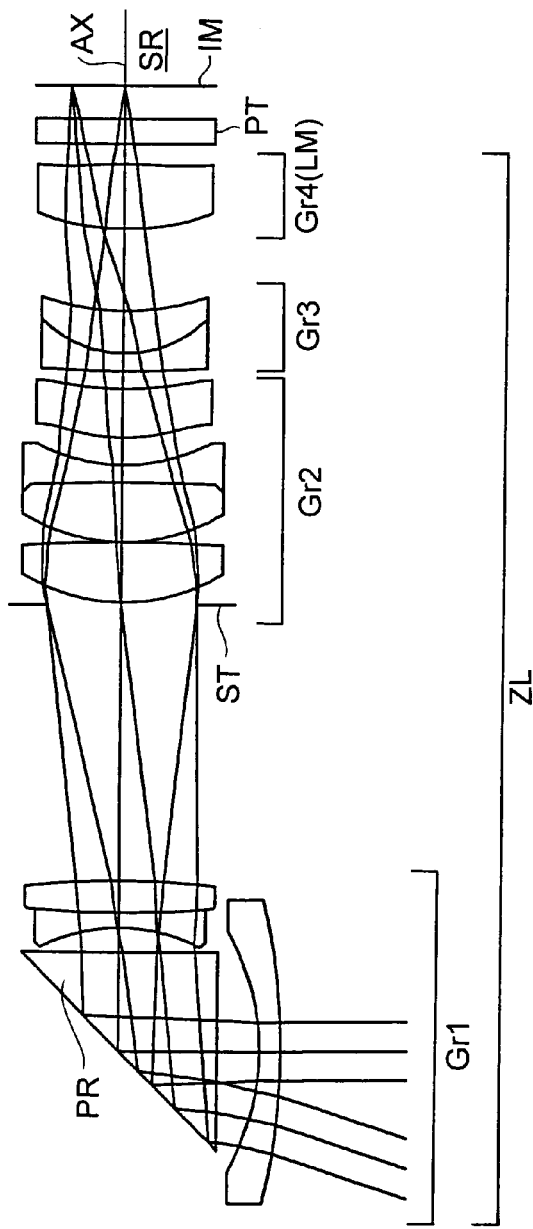
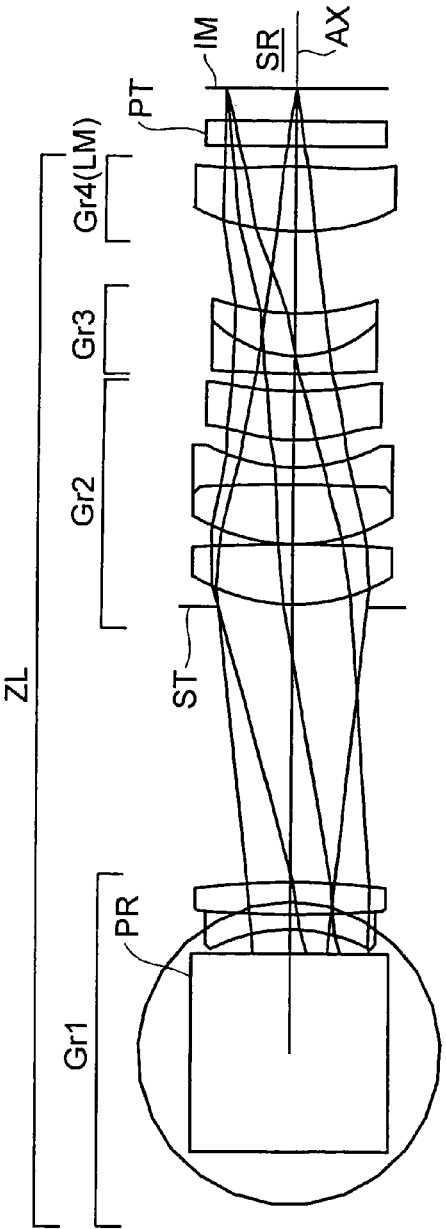
FIG.1A
FIG.1B (W)

(M)

(T)

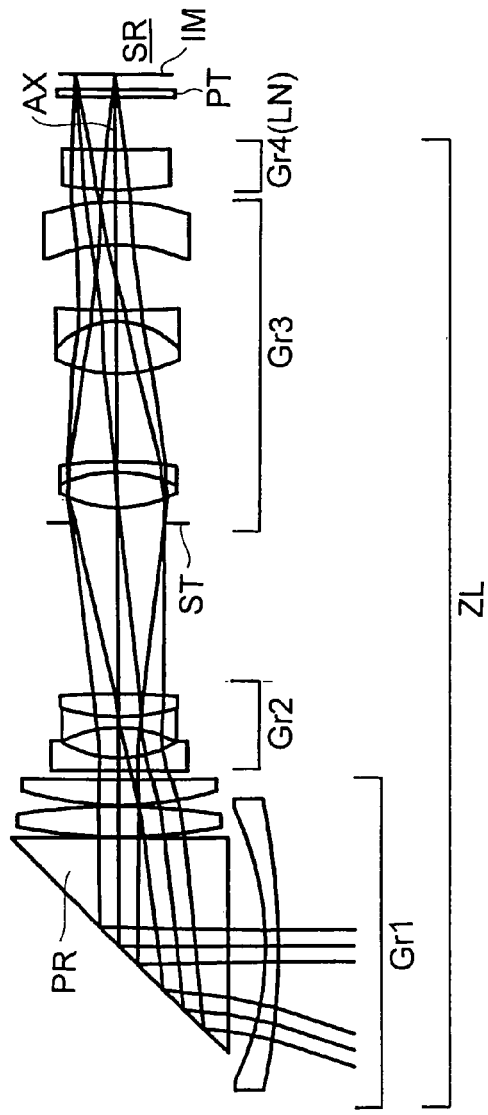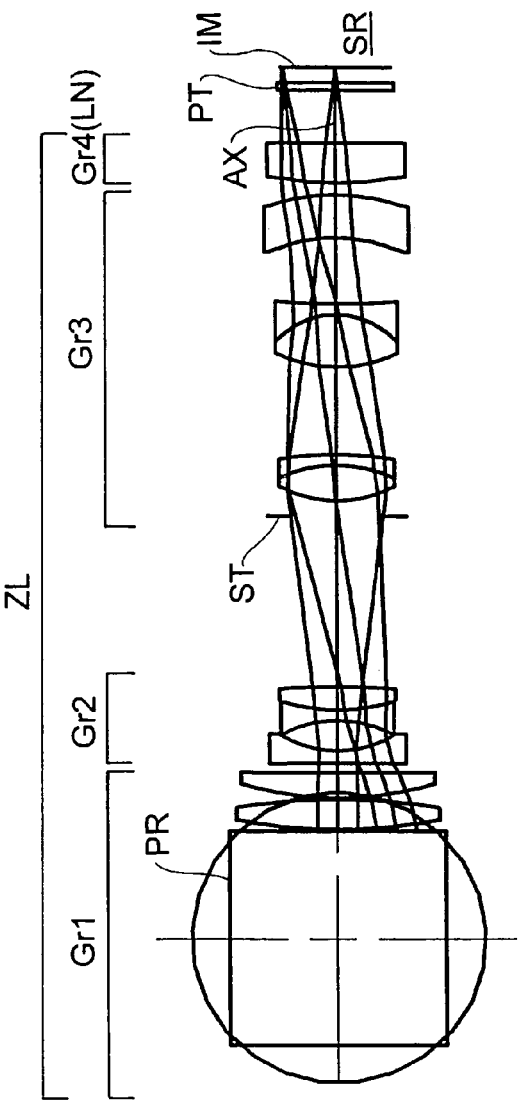
FIG.4A
FIG.4B

IMAGE-TAKING LENS UNIT

This application is based on Japanese Patent Application No. 2005-169360 filed on Jun. 9, 2005, the contents of which are hereby incorporated by reference.

BACKGROUND OF THE INVENTION

1. Field of the Invention

The present invention relates to an image-taking lens unit. More particularly, the present invention relates to an image-taking apparatus, such as a digital camera or a digital appliance equipped with an image capturing capability, that captures an image of a subject with an image sensor, and to a slim, high-zoom-ratio image-taking lens unit suitable for use in such an image-taking apparatus.

2. Description of Related Art

With the recent spread of personal computers, there have been increasing demands for digital cameras, which permit easy capturing of images. With this trend, increasingly slim digital cameras have been sought after, and accordingly increasingly slim image-taking lens systems have been craved for. On the other hand, some digital cameras now available on the market have achieved a dramatic slimming-down by the use of a prism disposed within its image-taking lens system. This prism bends the optical path, and thereby helps increase the flexibility with which an image sensor can be disposed inside the camera. FIG. 9 schematically shows the sectional structure of an image-taking lens unit 10 typically adopted in such a digital camera.

As will be understood from FIG. 9, the thickness $\Delta$ of the image-taking lens unit 10 depends on the outer diameter of the lens elements that are disposed downstream of where the optical path is bent. Accordingly, reducing the effective diameter of the lens elements disposed downstream of where the optical path is bent helps make the image-taking lens unit 10 slim. Since the effective diameter depends considerably on focal length, f-number, and other specifications, however, there is usually left little margin for the reduction of the effective diameter through efforts in designing. Even then, cutting off the region where the light relevant to image taking does not pass makes it possible to reduce the lens outer diameter in particular directions. This is because common image sensors have a rectangular image-sensing region, and thus, in a lens element disposed away from an aperture stop, the region where the light relevant to image taking passes is not circular. From this viewpoint, in the image-taking lens unit proposed in Patent Publication 1 listed below, a first and a second lens element disposed downstream and upstream of the bending of the optical path are given non-circular outer shapes. This minimizes the distance between those lens elements, and thus helps make the image-taking lens system slim.

Patent Publication 1: Japanese Patent Application Laid-open No. 2003-161878

Generally, molding a lens element in a non-circular shape with resin tends to result in larger astigmatism (that is, differences in curvature among different directions across the lens surface) than molding one in a circular shape. In the case of the first and second lens elements disclosed in Patent Publication 1, astigmatism tends to appear in the directions corresponding to the longer and shorter sides of the image-sensing region. Molding a lens element in a non-circular shape with optical glass is difficult, and, when one is molded of glass, it needs to be given a non-circular shape through after-processing. This leads to higher cost. Moreover, in the image-taking lens unit disclosed in Patent Publication 1, the axial ray of the light that passes through the first and second lens elements has a comparatively large height. Thus, giving the first and second lens elements non-circular outer shapes result in increased astigmatism in the directions corresponding to the longer and shorter sides of the image-sensing region.

SUMMARY OF THE INVENTION

In view of the conventionally experienced difficulties discussed above, it is an object of the present invention to provide a slim, high-performance image-taking lens unit, and to provide an image-taking apparatus incorporating such an image-taking lens unit.

To achieve the above object, according to one aspect of the present invention, an image-taking lens unit is provided with: an image-taking lens system that forms an optical image of an object; and an image sensor that receives the optical image in a rectangular image-sensing region and converts the optical image into an electrical signal. Here, the image-taking lens system includes a reflective optical element that bends the optical path. Moreover, of the lens elements constituting the image-taking lens system, the most image-side lens element called the last lens element is molded of resin, and is given a non-circular outer shape fulfilling conditional formula (1) below.

$$1 < TL/TS \tag{1}$$

where

TS represents the maximum outer dimension in the direction parallel to the shorter sides of the image-sensing region; and TL represents the maximum outer dimension in the direction parallel to the longer sides of the image-sensing region.

According to another aspect of the present invention, an image-taking lens unit is provided with: a variable-focal-length image-taking lens system that forms an optical image of an object at a variable magnification; and an image sensor that receives the optical image in a rectangular image-sensing region and converts the optical image into an electrical signal. Here, of the lens elements constituting the image-taking lens system, the most image-side lens element called the last lens element is given a non-circular outer shape fulfilling conditional formula (1) below. Moreover, the image-taking lens system includes a reflective optical element that bends the optical path, and fulfils conditional formula (3) below.

$$1 < TL/TS \tag{1}$$

$$3 \leq ft/fw \tag{3}$$

where

TS represents the maximum outer dimension in the direction parallel to the shorter sides of the image-sensing region;

TL represents the maximum outer dimension in the direction parallel to the longer sides of the image-sensing region;

fw represents the focal length of the entire image-taking lens system at the wide-angle end; and ft represents the focal length of the entire image-taking lens system at the telephoto end.

According to still another aspect of the present invention, an image-taking apparatus is provided with an image-taking lens unit constructed like one of the image-taking lens units described above.

Thus, according to the present invention, the last lens element is molded of resin, and is given a non-circular outer shape fulfilling a prescribed condition. This makes it possible to achieve an effective balance between slimness and high performance. Thus, it is possible to realize a slim, high-performance image-taking lens unit and an image-taking apparatus incorporating it. By applying an image-taking lens unit according to the present invention to an image-taking apparatus such as a digital camera or a portable information appliance, it is possible to make the apparatus slim lightweight, compact, inexpensive, high-performance, versatile, or otherwise improve it.

Since the last lens element is molded of plastic, it is easier to fabricate than when molded of glass, contributes to weight and cost reduction, and can be easily given an aspherical surface for effective correction of off-axial aberrations and matching of pupils. Moreover, since the last lens element is comparatively insensitive to errors in surface shapes and variations in refractive index, it can be molded of plastic without serious disadvantages. Moreover, molding the last lens element integrally with the member that holds the image sensor helps reduce the number of components, increase the accuracy of the positions of the last lens element and the image sensor relative to each other, prevent entry of dust, and obtain other benefits.

BRIEF DESCRIPTION OF THE DRAWINGS

FIGS. 1A and 1B are diagrams showing the optical path of a first embodiment (Example 1) of the present invention, as observed at the wide-angle end in sections parallel to the shorter and longer sides, respectively, of the image-sensing region;

FIGS. 4A and 4B are diagrams showing the optical path of a second embodiment (Example 2) of the present invention, as observed at the wide-angle end in sections parallel to the shorter and longer sides, respectively, of the image-sensing region;

DETAILED DESCRIPTION OF PREFERRED EMBODIMENTS

Hereinafter, image-taking lens units, image-sensing apparatuses, and the like embodying the present invention will be described with reference to the drawings. An image-taking lens unit embodying the present invention is an optical apparatus that optically captures an image of a subject and then outputs it in the form of an electrical signal. Such an image-taking lens unit is used as a main component of a camera used to take a still picture or a moving picture of a subject. Examples of such cameras include: digital cameras; video cameras; surveillance cameras; vehicle-mounted cameras; cameras for videophones; cameras for intercoms; and cameras incorporated in or externally fitted to digital appliances and the like, such as personal computers, mobile computers, cellular phones, personal digital assistances (PDAs), and peripheral devices for them (such as mouses, scanners, and printers). As these examples tell, it is possible not only to build cameras as image-taking apparatuses by the use of image-taking lens units, but also to add camera capabilities to various appliances by incorporating image-taking lens units in them. For example, it is possible to build, as an image-taking apparatus, a digital appliance equipped with an image capturing capability, such as a cellular phone equipped with a camera.

In the past, the term "digital camera" was used to refer exclusively to cameras that electronically record optical still pictures; nowadays, in this era in which digital still cameras and home-use movie cameras are available that can handle both still and moving pictures, the term has come to be used without the traditional connotation. Accordingly, it should be understood that, in the present specification, the term "digital camera" is used to refer to any kind of camera that incorporate as a main component an image-taking lens unit comprising an image-taking lens system for forming an optical image, an image sensor for converting the optical image into an electrical image signal, and other components. Specifically, examples of such cameras encompass, to name only a few: digital still cameras; digital movie cameras; and web cameras (that is, cameras, whether of an open type or of a private type, that are connected to an appliance connected to a network to permit exchange of images, including both those connected directly to the network and those connected to it via an appliance, such as a personal computer, having information processing capabilities).

Figure 8:
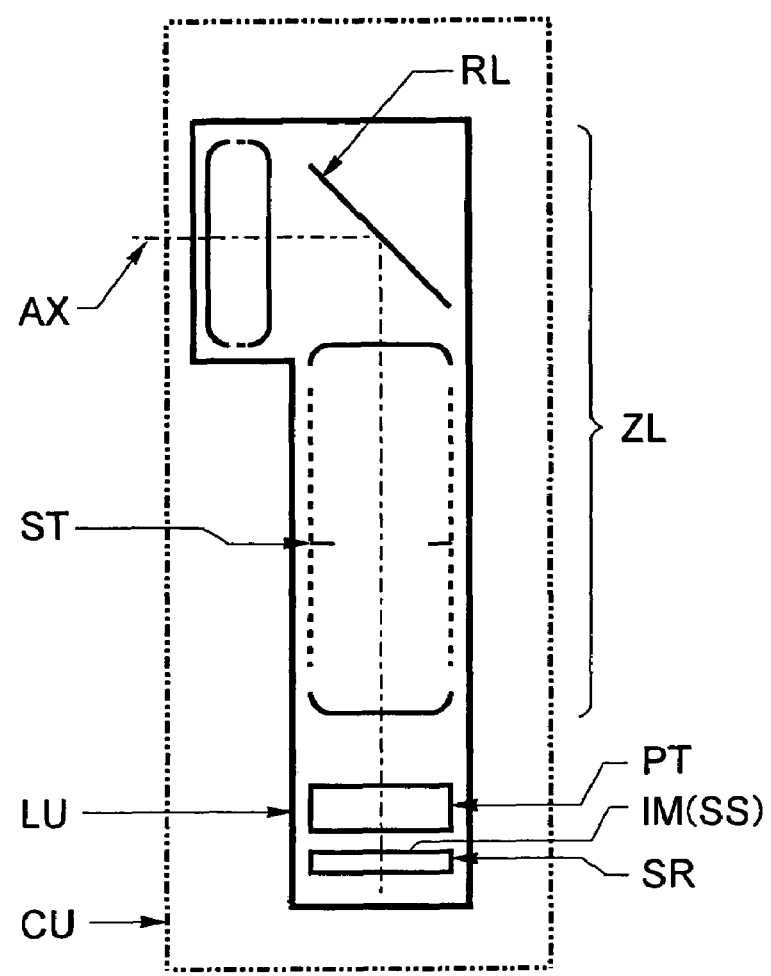
FIG. 8 is a side sectional view of a camera incorporating an image-taking lens unit, schematically showing an example of the optical construction thereof.
Figure 9:
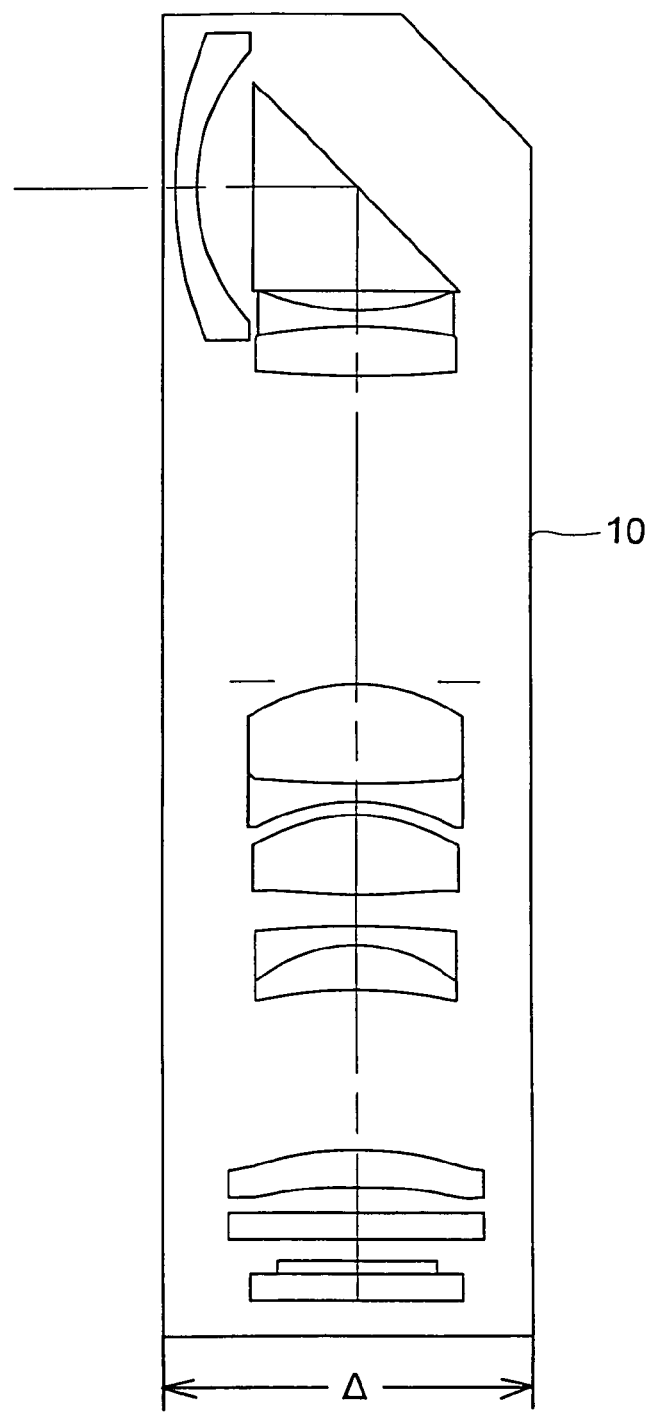
FIG. 9 is a side sectional view of a camera incorporating a conventional image-taking lens unit, schematically showing an example of the optical construction thereof.

FIG. 8 is a sectional view of a camera CU (corresponding to an image-taking apparatus such as a digital camera or a digital appliance equipped with an image capturing capability), schematically showing an example of the optical construction thereof. The camera CU incorporates an image-taking lens unit LU. This image-taking lens unit LU comprises, from the object side (that is, the subject side): a zoom lens system ZL (corresponding to a variable-magnification optical system serving as an image-taking lens system; including an aperture stop ST) that forms an optical image IM (image surface) of an object at a variable magnification; a plane-parallel plate PT (corresponding to an optical filter such as an optical low-pass filter, an infrared cut filter, or the like provided as necessary, and also to the cover glass of an image sensor SR or the like); and an image sensor SR that converts the optical image IM formed on an image-sensing surface SS thereof by the zoom lens system ZL into an electrical signal. Thus, the image-taking lens unit LU forms part of the camera CU, which corresponds to a digital camera or a digital appliance equipped with an image capturing capability (specifically, a compact, portable information appliance or terminal such as a cellular phone or a PDA). When this image-taking lens unit LU is used to build a digital camera, it is usually arranged inside the body of the camera. When the image-taking lens unit LU is used otherwise to realize a camera capability, it is possible to adopt a construction that suits particular needs. For example, the image-taking lens unit LU may be built as a separable unit that can be removably or rotatably attached to a camera body, or may be built as a separable unit that can be removably or rotatably attached to a portable information appliance (such as a cellular phone or a PDA).

In the image-taking lens unit LU shown in FIG. 8, a reflective surface RL having a flat surface is disposed in the middle of the optical path of the zoom lens system ZL. At least one lens element is disposed upstream of the reflective surface RL, and at least one lens element is disposed downstream of the reflective surface RL. The reflective surface RL bends the optical path, and thereby permits the zoom lens system ZL to serve as a bending optical system. Here, the reflective surface RL reflects light in such a way that the optical axis AX is bent appropriately at 90 degrees (that is, exactly or substantially at 90 degrees). Disposing the reflective surface RL for bending the optical path in the middle of the optical path of the zoom lens system ZL as described above provides the following benefits: the image-taking lens unit LU can be arranged with more flexibility; and the thickness-direction dimension of the image-taking lens unit LU can be so altered as to make the image-taking lens unit LU appear slim. Particularly effective slimming-down can be achieved with a construction in which, as in the first and second embodiments (FIGS. 1A, 1B, 4A, 4B, etc.) described later, a negative lens element is used as the most object-side lens element, and the reflective surface RL is disposed on the image side of the negative lens element. As necessary, the optical path may be bent elsewhere than in the middle of the zoom lens system ZL, for example, upstream or downstream of the zoom lens system ZL. By appropriately bending the optical path, it is possible to effectively make the camera CU incorporating the image-taking lens unit LU apparently slim and compact.

The reflective surface RL is realized with a reflective optical element such as a kind of a prism (such as a rectangular prism) or a kind of mirror (such as a flat mirror). For example, in the first and second embodiments (FIGS. 1A, 1B, 4A, 4B, etc.) described later, a prism PR (preferably, a rectangular prism) is used as a reflective optical element. A reflective optical element that can be used, however, is not limited to a kind of prism; the reflective surface RL may be realized by the use of a kind of mirror, such as a flat mirror, as a reflective optical element. Instead, it is also possible to use a reflective optical element that reflects light in such a way that the optical axis AX of the zoom lens system ZL is bent approximately at 90 degrees with two or more reflective surfaces. The optical path may be bent by any kind of optical effect other than reflection, for example, refraction, diffraction, or any combination of these. That is, it is possible to use a bending optical member having a reflective surface, a refractive surface, a diffractive surface, or any combination of these.

The prism PR used in the first and second embodiments described later has no optical power (that is, a quantity defined as the reciprocal of the focal length). It is, however, also possible to give an optical power to the optical member that bends the optical path. For example, the reflective surface RL, the light-entrance-side surface, the light-exit surface, or any other surface of the prism PR may be made responsible for the optical power of the zoom lens system ZL. This makes it possible to alleviate the burden on the lens elements in terms of the optical power they are responsible for, and thereby to obtain higher optical performance. For example, in the zoom lens system ZL shown in FIGS. 1A and 1B etc., where a negative lens element is disposed on the object side of the prism PR, it is also possible, instead of disposing the negative lens element, to give a curvature to the object-side surface (that is, the light-entrance-side surface) of the prism PR to give it a negative (or positive) optical power.

The zoom lens system ZL is composed of a plurality of lens groups, and is so constructed as to achieve magnification variation (that is, zooming) by moving at least one lens group along the optical axis AX and thereby varying at least one distance between lens groups. The first embodiment (FIGS. 1A, 1B, 2A, 2B, and 2C) adopts a four-group zoom construction composed of a negative, a positive, a negative, and a positive lens group. Here, the second and third lens groups Gr2 and Gr3 are movable, and the first and fourth lens groups Gr1 and Gr4 are stationary. On the other hand, the second embodiment (FIGS. 4A, 4B, 5A, 5B, and 5C) adopts a four-group zoom construction composed of a positive, a negative, a positive, and a positive lens group. Here, the second, third, and fourth lens groups Gr2, Gr3, and Gr4 are movable, and the first lens group Gr1 is stationary. The image-taking lens system that is used as the image-taking lens unit LU is not limited to a zoom lens system ZL. It is also possible to use, instead of the zoom lens system ZL, any other type of variable-magnification optical system (for example, a variable-focal-length imaging optical system such as a varifocal lens system or a lens system switchable among a plurality of focal lengths) or a single-focal-length optical system.

When the optical image to be formed by the zoom lens system ZL passes through the optical low-pass filter (corresponding to the plane-parallel plate PT shown in FIG. 8), which has a predetermined cut-off frequency characteristic determined by the pixel pitch of the image sensor SR, the spatial frequency characteristic of the optical image is so adjusted as to minimize the so-called aliasing noise that is produced when the optical image is converted into an electrical signal. This helps suppress color moiré. By suppressing the performance around the resolution limit frequency, however, it is possible to make generation of noise unlikely without the use of an optical low-pass filter. Also in a case where a user takes or views images by the use of a display system on which noise is not clearly recognizable (for example, the liquid crystal screen of a cellular phone), there is no need to use an optical low-pass filter in the image-taking lens system.

Used as the optical low-pass filter is a birefringence-type low-pass filter or a phase-type low-pass filter. Examples of birefringence-type low-pass filters include: those formed of a birefringent material, such as quartz, having the crystal axis thereof aligned with a predetermined direction; and those having laid together wavelength plates or the like that vary the polarization direction. Examples of phase-type low-pass filters include: those that achieve the desired optical cut-off frequency characteristic through diffraction.

Used as the image sensor SR is a solid-state image sensor such as a CCD (charge-coupled device) or a CMOS (complementary metal-oxide-semiconductor) sensor having a plurality of pixels. The optical image formed by the zoom lens system ZL (on the image-sensing surface SS of the image sensor SR) is converted into an electrical signal by the image sensor SR. The signal produced by the image sensor SR is, after being subjected to predetermined digital image processing, image compassion processing, or other processing as necessary, recorded in a memory (such as a semiconductor memory or an optical disk), and is then, as the case may be, transmitted to another appliance via a cable or after being converted into an infrared signal.

In the image-taking lens unit LU shown in FIG. 8, the zoom lens system ZL performs reduction projection from the enlargement-side subject to the reduction-side image sensor SR. Instead of the image sensor SR, a display device (for example, a liquid crystal display device) that displays a two-dimensional image may be used, in which case the zoom lens system ZL is used as a projection lens system. In this way, it is possible to build an image projection apparatus that performs enlargement projection from the reduction-side image display surface to an enlargement-side screen surface. That is, the zoom lens system ZL described below can be suitably used not only as an image-taking lens unit but also as a projection lens system.

FIGS. 1A and 1B are lens construction diagrams corresponding to the zoom lens system ZL used in a first embodiment of the present invention, showing the lens arrangement and optical path thereof as observed at the wide-angle end W in different optical sections, with the optical path of the bending optical system bent. FIGS. 4A and 4B are lens construction diagrams corresponding to the zoom lens system ZL used in a second embodiment of the present invention, showing the lens arrangement and optical path thereof as observed at the wide-angle end W in different optical sections, with the optical path of the bending optical system bent. FIGS. 1A and 4A show the optical section along the plane parallel to the shorter sides of the image sensor SR and including the optical axis AX, and FIGS. 1B and 4B show the optical section along the plane parallel to the longer sides of the image sensor SR and including the optical axis AX.

Figure 2A:
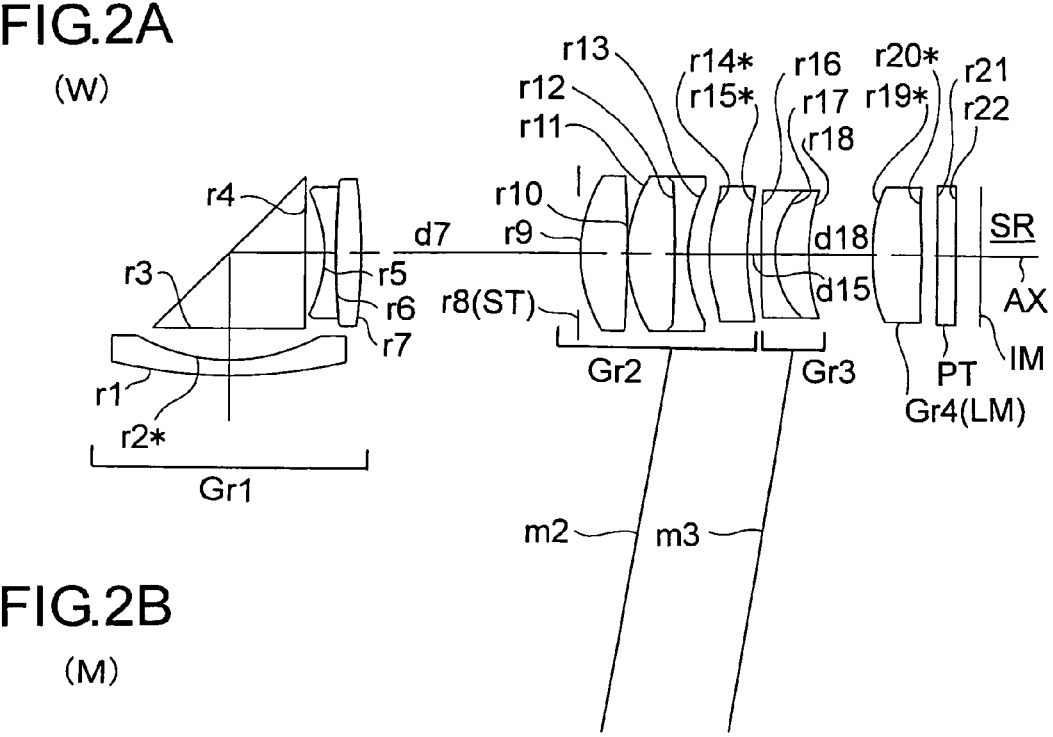
FIGS. 2A to 2C are diagrams showing the lens construction of the first embodiment (Example 1)
Figure 2B:
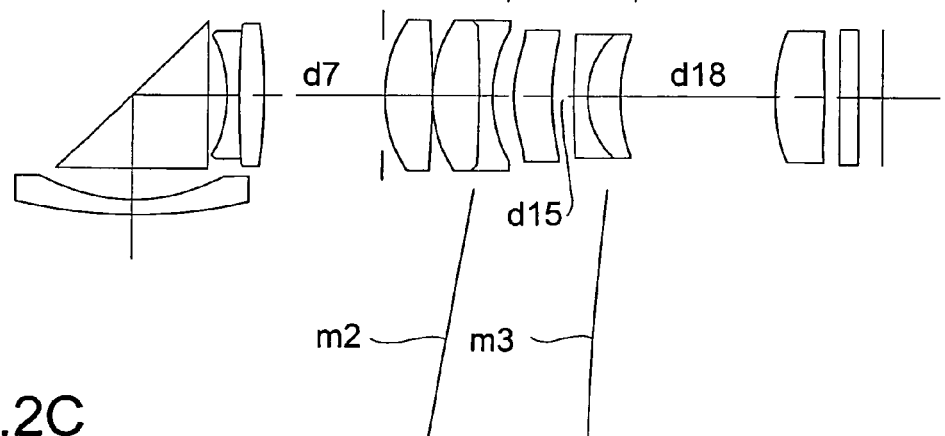
Figure 2C:
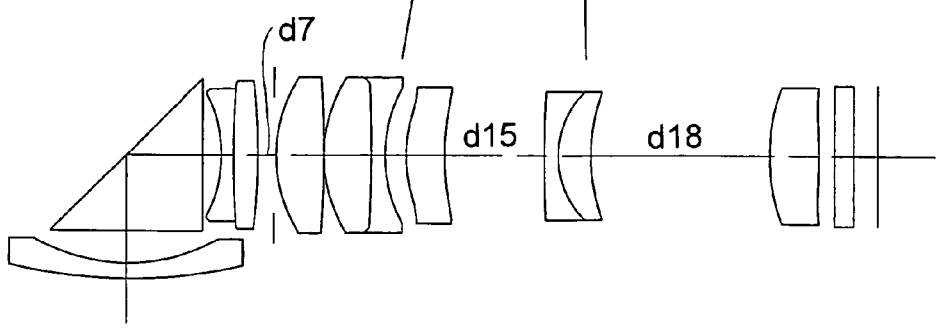
Figure 5A:
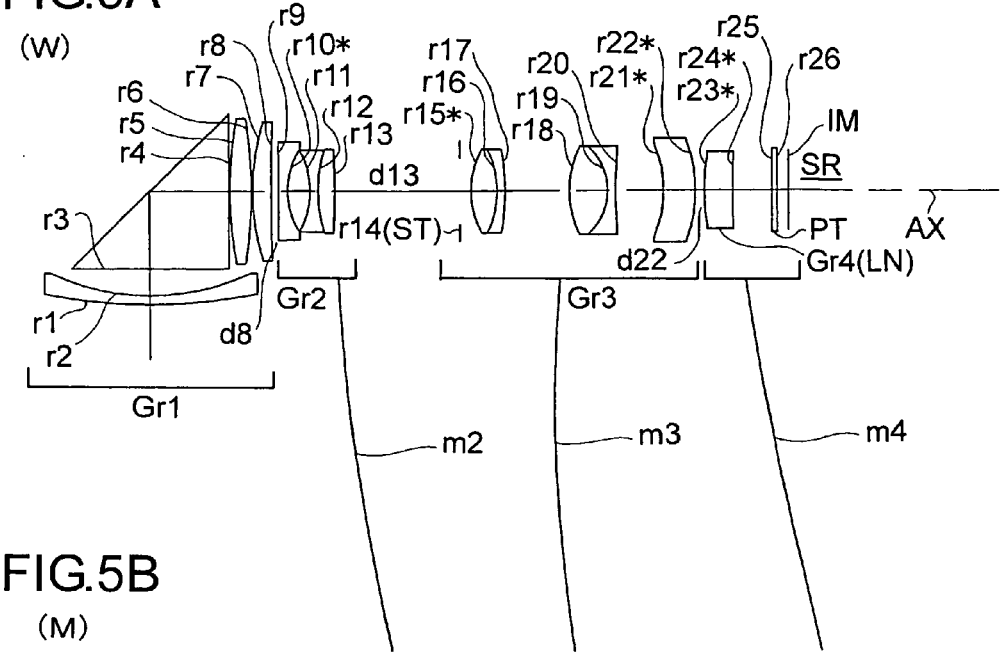
FIGS. 5A to 5C are diagrams showing the lens construction of the second embodiment (Example 2)
Figure 5B:
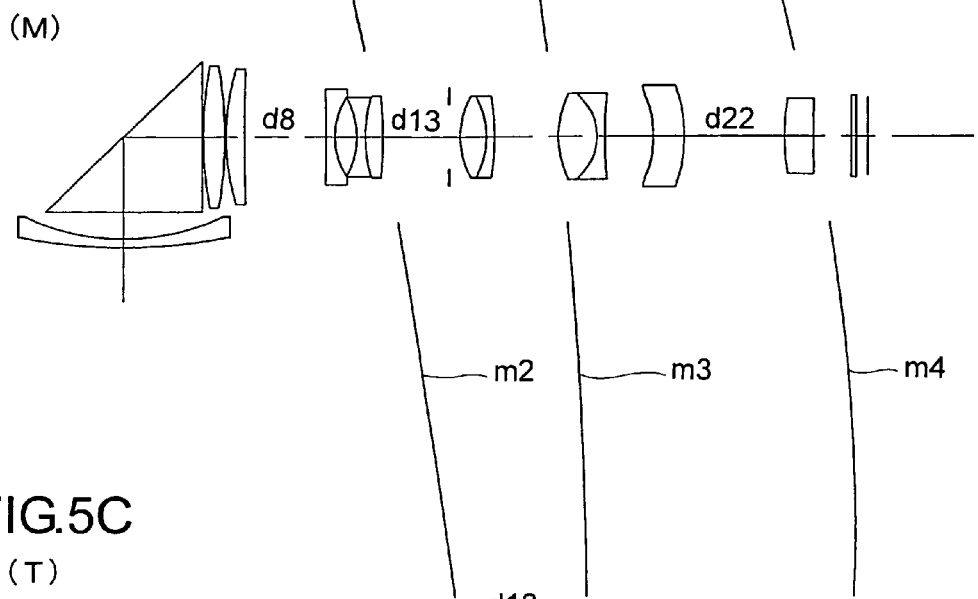
Figure 5C:
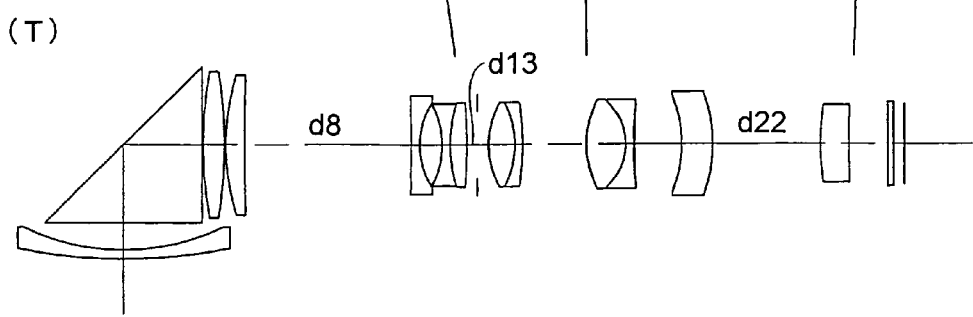

FIGS. 2A to 2C are lens construction diagrams corresponding to the zoom lens system ZL used in the first embodiment, showing the lens arrangement and optical path thereof as observed at the wide-angle end W, at the middle focal length M, and at the telephoto end T, respectively, in an optical section, with the optical path of the bending optical system bent. FIGS. 5A to 5C are lens construction diagrams corresponding to the zoom lens system ZL used in the second embodiment, showing the lens arrangement and optical path thereof as observed at the wide-angle end W, at the middle focal length M, and at the telephoto end T, respectively, in an optical section, with the optical path of the bending optical system bent. In FIGS. 2A to 2C and 5A to 5C, the following conventions are used. A surface indicated by ri. (i=1, 2, 3, . . .) is the i-th surface counted from the object side, and a surface whose symbol ri is marked with an asterisk (*) is an aspherical surface. An axial distance indicated by di (i=1, 2, 3, . . .) is the i-th axial distance counted from the object side, though only those axial distances which vary during zooming are shown here. Lines m2 and m3 represent movement loci that schematically indicate the movement of the second and third lens groups Gr2 and Gr3, respectively, during zooming from the wide-angle end W to the middle focal length M and from the middle focal length M to the telephoto end T. Lines m4 represent movement loci that schematically indicate the movement of the fourth lens group Gr4, the plane-parallel plate PT, and the image sensor SR during zooming from the wide-angle end W to the middle focal length M and from the middle focal length M to the telephoto end T. It should be noted that any lens element or other component for which no movement locus is indicated remains stationary during zooming.

The zoom lens system ZL (FIGS. 1A, 1B, 2A, 2B, and 2C) used in the first embodiment is composed of four lens groups, namely, from the object side: a first lens group Gr1 having a negative optical power, a second lens group Gr2 having a positive optical power, a third lens group Gr3 having a negative optical power, and a fourth lens group Gr4 having a positive optical power. This zoom lens system ZL is so constructed that, during zooming from the wide-angle end W to the telephoto end T, while the first lens group Gr1 and the components from the fourth lens group Gr4 to the image sensor SR remain stationary, the second and third lens groups Gr2 and Gr3 move. Specifically, during the zooming from the wide-angle end W to the telephoto end T, the second lens group Gr2 moves monotonically toward the object side, and the third lens group Gr3 first moves toward the object side until it comes closest to the object side a while before it reaches the telephoto end T and then moves slightly back toward the image side to reach the telephoto end T. In this four-group zoom construction composed of a negative, a positive, a negative, and a positive lens group, each lens group is composed as follows.

The first lens group Gr1 is composed of, from the object side: a negative meniscus lens element concave to the image side and having an aspherical surface on the image side; a prism PR; and a cemented lens element composed of a biconcave negative lens element and a biconvex positive lens element. The second lens group Gr2 is composed of, from the object side: an aperture stop ST; a biconvex positive lens element; a cemented lens element composed of a biconvex positive lens element and a biconcave negative lens element; and a positive meniscus lens element convex to the object side and having aspherical surfaces on both sides. The third lens group Gr3 is composed solely of a cemented lens element composed of, from the object side, a negative meniscus lens element concave to the image side and a positive meniscus lens element convex to the object side. The fourth lens group Gr4 is composed solely of a biconvex positive lens element (last lens element LM) having aspherical surfaces on both sides.

The zoom lens system ZL (FIGS. 4A, 4B, SA, 5B, and 5C) used in the second embodiment is composed of four lens groups, namely, from the object side: a first lens group Gr1 having a positive optical power, a second lens group Gr2 having a negative optical power, a third lens group Gr3 having a positive optical power, and a fourth lens group Gr4 having a positive optical power. This zoom lens system ZL is so constructed that, during zooming from the wide-angle end W to the telephoto end T, while the first lens group Gr1 remains stationary, the second lens group Gr2, the third lens group Gr3, and the components from the fourth lens group Gr4 on move independently. Specifically, during zooming from the wide-angle end W to the telephoto end T, while the first lens. group Gr1 remains stationary, the second lens group Gr2 moves monotonically toward the image side, the third lens group Gr3 first moves toward the object side until it comes closest to the object side a while after it left the wide-angle end W and then moves monotonically toward the image side, and the fourth lens group Gr4 and the image surface IM first move toward the image side until it comes closest to the image side a while before it reaches the telephoto end T and then moves slightly backward toward the object side to reach the telephoto end T. In this four-group zoom construction composed of a positive, a negative, a positive, and a positive lens group, each lens group is composed as follows.

The first lens group Gr1 is composed of, from the object side: a negative meniscus lens element concave to the image side; a prism PR; a biconvex positive lens element; and a positive meniscus lens element convex to the object side. The second lens group Gr2 is composed of, from the object side: a biconcave negative lens element having an aspherical surface on the image side; and a cemented lens element composed of a biconcave negative lens element and a biconvex positive lens element. The third lens group Gr3 is composed of, from the object side: an aperture stop ST; a cemented lens element composed of a biconvex positive lens element having an aspherical surface on the object side and a negative meniscus lens element concave to the object side; a cemented lens element composed of a biconvex positive lens element and a biconcave negative lens element; and a negative meniscus lens element concave to the object side and having aspherical surfaces on both sides. The fourth lens group Gr4 is composed solely of a positive meniscus lens element (last lens element LN) convex to the object side and having aspherical surfaces on both sides.

In an image-taking lens unit like those of the first and second embodiments, that incorporates an image-taking lens system that forms an optical image of an object and an image sensor that receives the optical image in a rectangular image-sensing region and then converts the optical image into an electrical signal, providing the image-taking lens system with a reflective optical element that bends the optical path makes it possible to make the image-taking lens unit slim. As described earlier, the thickness of an image-taking lens unit depends on the outer diameter of the lens elements that are disposed downstream of where the optical path is bent. Thus, by cutting off as much of the region where the light relevant to image taking does not pass, specifically, by reducing the outer diameter of those lens elements in particular directions, it is possible to make the image-taking lens unit slimmer. In general, however, molding a lens element so that it has a non-circular outer shape, as compared with molding it so that it has a circular outer shape, tends to result in larger astigmatism (that is, differences in curvature among different directions across the lens surface). Thus, if the axial ray of the light that passes through the lens element has a comparatively large height, increased astigmatism results. To avoid this, it is preferable that the last lens elements of the image-taking lens system (that is, of the lens elements constituting the image-taking lens system, the most image-side one) be given a non-circular outer shape (for example, rectangular, substantially rectangular, elliptic, substantially elliptic, oval, or substantially oval) that fulfills conditional formula (1) below.

$$1 < TL/TS \tag{1}$$

where
- TS represents the maximum outer dimension in the direction parallel to the shorter sides of the image-sensing region; and
- TL represents the maximum outer dimension in the direction parallel to the longer sides of the image-sensing region.

Fulfilling conditional formula (1) makes it possible to make the outer shape of the non-circular last lens element so small as to correspond to the shape of the image-sensing region. A lens element used in an image-taking lens system is typically given a circular shape with its center located on the optical axis, but, the closer the lens element is to the image surface, the closer the shape of the region within which light passes through the lens element to the shape of the image-sensing region, and thus the larger the region where the light that will reach the image-sensing region (that is, the light relevant to image taking) does not pass. Thus, if the last lens element is given a non-circular outer shape that fulfills conditional formula (1), since the last lens element is close to the image surface, the axial ray of the light that passes through the last lens element has a small height. Thus, even when the last lens element is given a non-circular outer shape, the resulting astigmatism little affects aberrations, and therefore it is possible to make the image-taking lens unit slim while maintaining high optical performance in the image-taking lens system. Moreover, when the last lens element is given a non-circular outer shape that fulfills conditional formula (1), even in a case where a high-zoom-ratio variable-magnification optical system is used as an image-taking lens system as in the first and second embodiments, it is possible to achieve an effective balance between slimness and high performance in the image-taking lens unit without degrading aberration performance. Thus, it is possible to realize a high-performance, high-zoom-ratio, but nevertheless slim image-taking lens unit. By incorporating the image-taking lens unit in an image-taking apparatus such as a digital camera or a digital appliance equipped with an image-capturing capability, it is possible to make the apparatus slim, lightweight, compact, inexpensive, high-performance, versatile, or otherwise improve it.

It is further preferable that conditional formula (1a) below be fulfilled.

$$4/3 < TL/TS \tag{1a}$$

This conditional formula (1a) defines, within the conditional range defined by conditional formula (1) above, a conditional range further preferable out of the above-stated and other considerations. Fulfilling conditional formula (1a) makes it possible to cope with a common image sensor having a rectangular image-sensing region while achieving a proper balance between slimness and high performance in an image-taking lens unit.

It is preferable that the last lens element be molded of resin. In other words, it is preferable that a plastic lens element be used as the last lens element. Molding the last lens element with plastic makes it possible to give it an optimal outer shape at the same time that its lens surfaces are molded. Thus, the desired shape can be obtained easily at lower cost than by cutting off unnecessary portions of a glass lens element having a circular outer shape. The last lens element is comparatively insensitive to errors in surface shapes and variations in refractive index. This makes it less disadvantageous to use, as the material of the last lens element, plastic, which is inferior to glass in properties such as surface accuracy obtained through molding, thermal expansion coefficient, and temperature dependence of refractive index. Moreover, giving the last lens element an aspherical surface is effective in correcting off-axial aberrations and matching pupils. Advantageously, a lens element molded of plastic can be given an aspherical surface at no extra cost, and thus a plastic-molded lens element having an aspherical surface can be produced at lower cost than a glass lens element having spherical surfaces.

As described above, however, molding a lens element in a non-circular outer shape tends to result in larger astigmatism (that is, differences in curvature among different directions across the lens surface), and thus, if the axial ray of the light that passes through that lens element has a comparatively large height, increased astigmatism results. However, since the last lens element is close to the image surface, the axial ray of the light that passes through the last lens element has a small height. Furthermore, for effective reduction of the influence of the astigmatism produced by the last lens element on aberrations, it is preferable that conditional formula (2) below be fulfilled.

$$4 < LD \cdot FN/LB \tag{2}$$

where
- LD represents the diagonal length of the image-sensing region;
- FN represents the f-number of the image-taking lens system (the minimum value of the f-number in a case where the f-number varies); and
- LB represents the air-equivalent distance from the vertex of the image-side surface of the last lens element to the image surface (the maximum value of the distance in a case where the distance varies).

The height of the axial ray depends on the f-number FN and the distance LB. Thus, sensitivity to axial astigmatism depends on the f-number FN such that, the smaller the f-number FN, the larger the aberrations. Conditional formula (2) defines, through normalization with respect to the diagonal length LD of the image-sensing region, a conditional range that should preferably be fulfilled to reduce both the influence of astigmatism on aberration and the thickness of the image-taking lens unit. If the conditional range defined by conditional formula (2) is disregarded, the shape of the light passage region becomes closer to the shape of the aperture than to the shape of the image-sensing region. This reduces the region that can be cut off in the last lens element, and thus diminishes the benefit of giving the last lens element a non-circular outer shape. In addition, the axial ray comes to have a large height. This increases the susceptibility to the influence of surface shape errors (that is, astigmatism) that tend to appear when a plastic lens element is molded so that it has an outer shape close to a rectangular shape.

In a case where, as in the first and second embodiments, a variable-magnification optical system such as a zoom lens system is used as an image-taking lens system, generally, the shorter the focal length, the smaller the f-number. Thus, the f-number FN appearing in conditional formula (2) is that observed at the wide-angle end W, where the f-number FN is at its minimum. In a case where the distance LB varies as the magnification is varied, the maximum value of the distance is used as the distance LB. Thus, when a variable-magnification optical system is used as a image-taking lens system, it is preferable that conditional formula (2) be fulfilled over the entire focal-length range.

Figure 3:
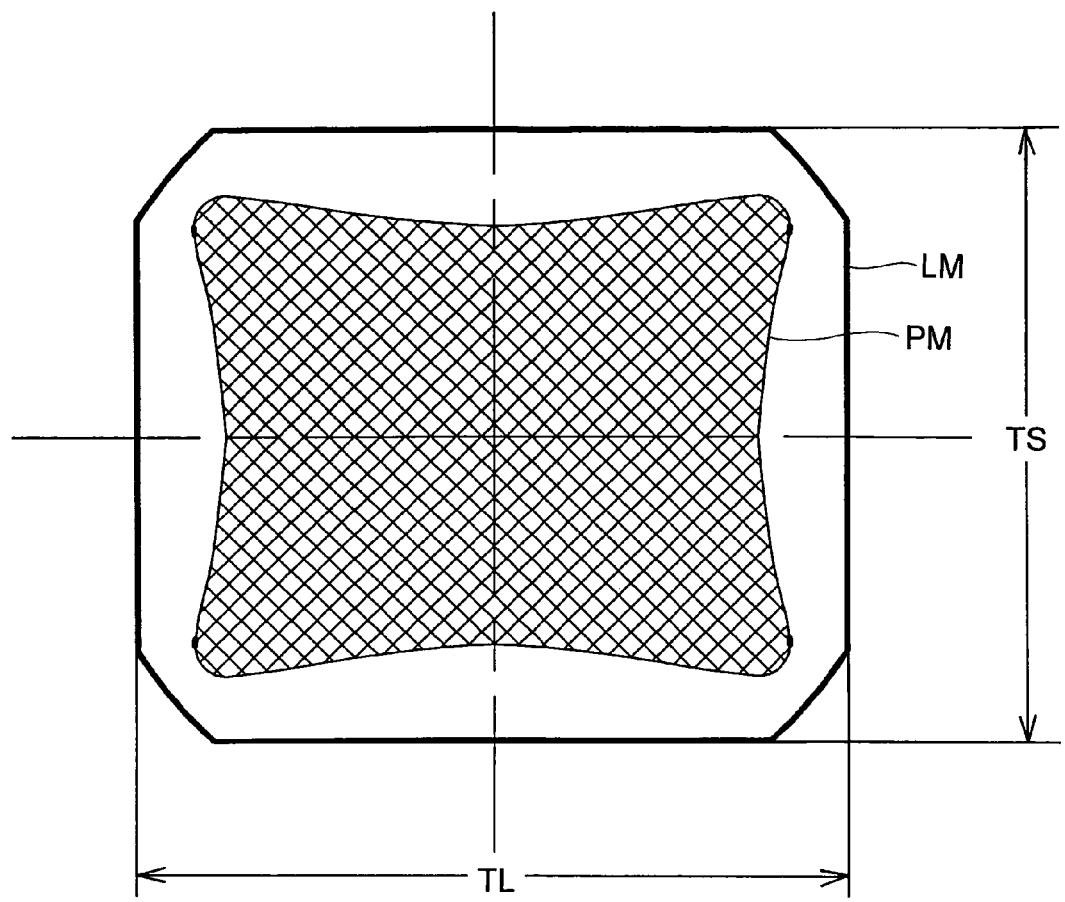
FIG. 3 is a front view of the last lens element of the first embodiment (Example 1), showing the outer shape thereof and the light passage region on the front face thereof.

FIG. 3 shows the outer shape of the last lens element LM used in the first embodiment (FIGS. 1A, 1B, 2A, 2B, and 2C), with the light passage region PM on the front surface thereof shown together. The light passage region PM is where the light that will reach the rectangular image-sensing region passes. The closer a lens element is to the image surface IM (see FIGS. 1A and 1B etc.), the closer the shape of the light passage region PM to the shape of the image-sensing region. Thus, when the last lens element LM is given a non-circular (in this embodiment, substantially rectangular) outer shape that fulfills conditional formula (1), and in addition, as shown in FIG. 3, the outer shape of the last lens element LM is made as close as possible to the shape of the light passage region PM, it is possible to effectively slim down the image-taking lens unit and simultaneously achieve flair cutting. That is, by making the outer shape of the last lens element LM as geometrically similar as possible to the shape of the image-sensing region and thereby making the outer shape of the last lens element LM as close as possible to the shape of the light passage region PM, it is possible not only to make the image-taking lens unit LU slim but also to let the last lens element LM function also as a beam restricting plate (for example, a flare cutter) for cutting unnecessary light.

Figure 7A:
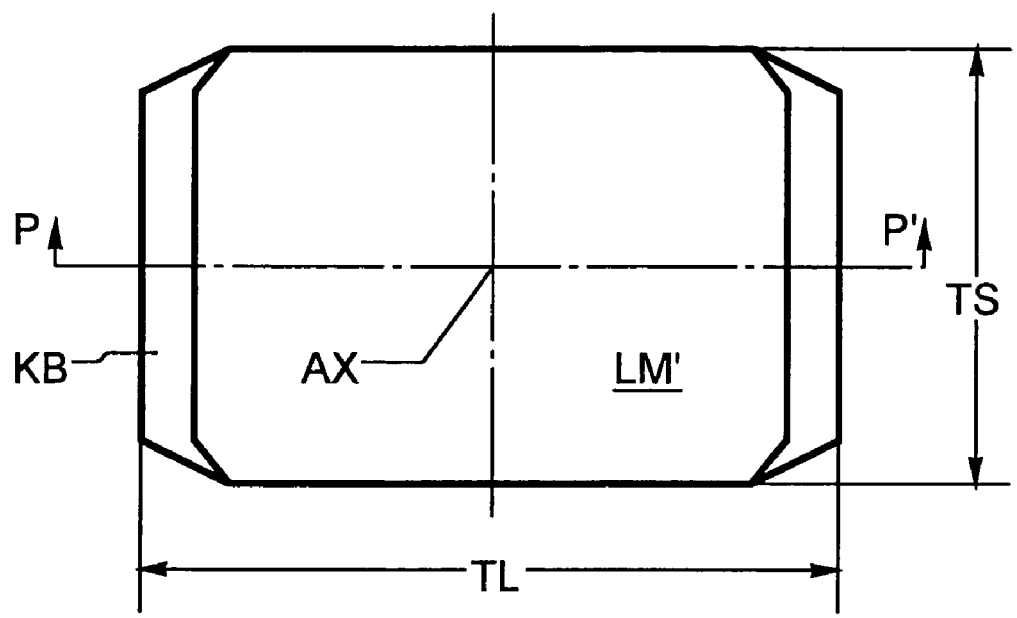
FIGS. 7A and 7B are diagrams showing the last lens element having edge portions thereof shaped so as to be fitted to a lens barrel.
Figure 7B:
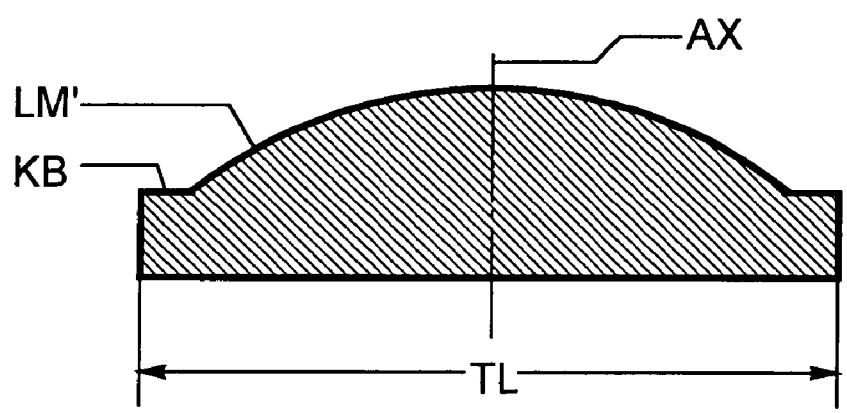

FIGS. 7A and 7B show the outer shape of another example of the last lens element LM' that can be used in the first embodiment (FIGS. 1A, 1B, 2A, 2B, and 2C). FIG. 7A shows the appearance of the last lens element LM' as seen along the optical axis AX, and FIG. 7B shows the section taken along line P-P' shown in FIG. 7A. This last lens element LM' too has a substantially rectangular outer shape, and in addition has edge portions thereof, along both shorter sides thereof, formed into fitting portions KB at which the last lens element LM' is fitted to a lens barrel. These fitting portions KB are so formed as to extend in the direction of the longer sides of the last lens element LM', and thus do not influence the thickness of the image-taking lens unit LU.

Figure 6A:
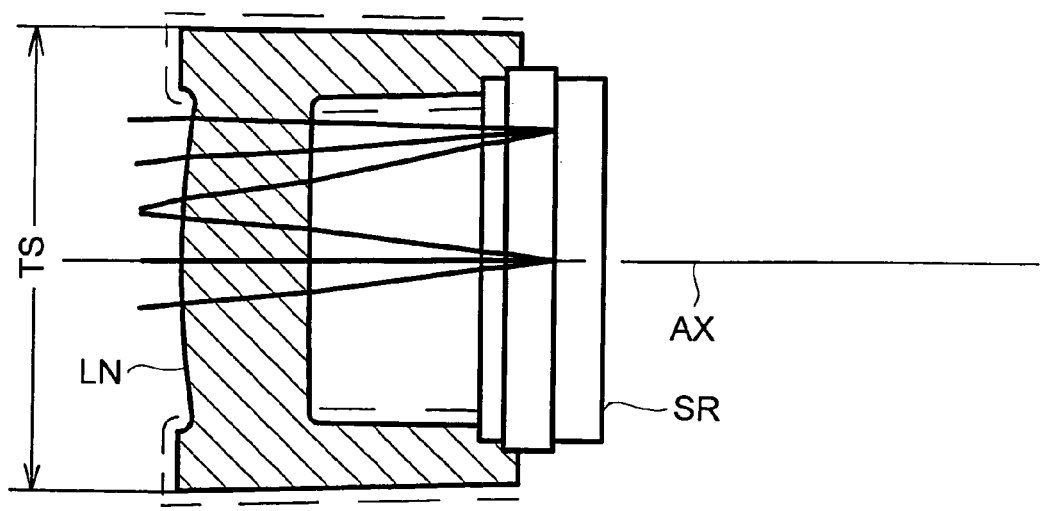
FIGS. 6A and 6B are sectional views of the last lens element of the second embodiment (Example 2), showing the outer shape thereof.
Figure 6B:
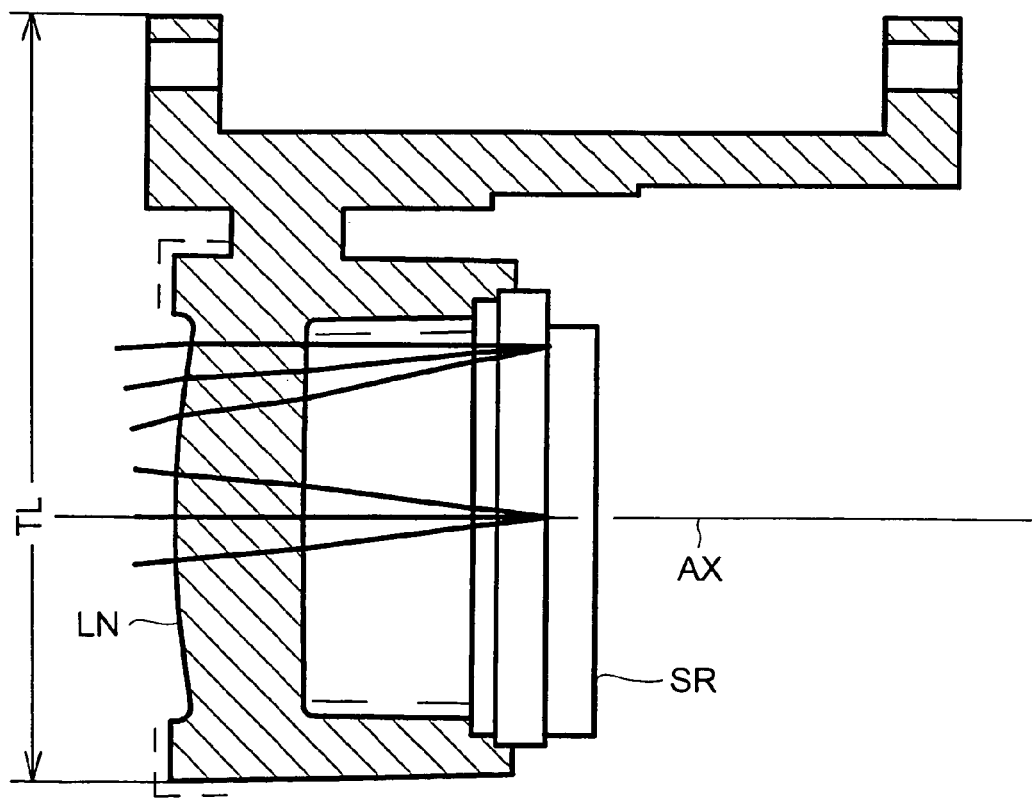

FIGS. 6A and 6B show the outer shape of the last lens element LN used in the second embodiment (FIGS. 4A, 4B, 5A, 5B, and 5C). FIG. 6A shows an optical section along the plane parallel to the shorter sides of the image-sensing region of the image sensor SR and including the optical axis AX, and FIG. 6B shows an optical section along the plane parallel to the longer sides of the image-sensing region of the image sensor SR and including the optical axis AX. This last lens element LN is molded integrally with the member that holds the image sensor SR. The portion of the last lens element LN enclosed by broken lines in the figures has been so treated as to exhibit a lower transmissivity to light (for example, coated in black to reduce stray light). Thus, the last lens element LN has a portion through which light needs to be passed to form an optical image and a portion that has been so treated as to have a lower transmissivity than the first-mentioned portion.

Molding the last lens element LN integrally with the member that holds the image sensor SR helps reduce the number of components, increase the accuracy of the positions of the last lens element LN and the image sensor SR relative to each other, prevent entry of dust into the gap between the last lens element LN and the image sensor SR, and obtain other benefits. Moreover, the last lens element LN shown in FIGS. 6A and 6B has a lens-frame structure that permits it, as fourth lens group Gr4, to move together with the image sensor SR for zooming. Thus, in addition to the already mentioned benefits, it is also possible to simplify the zoom construction. Moreover, by coating in black or otherwise reducing the transmissivity of the portion of the last lens element LN where light does not need to be passed (the portion enclosed by broken lines) with a view to reducing stray light, it is possible to prevent image degradation attributable to stray light.

In an image-taking lens unit, like those of the first and second embodiments, that incorporates a variable-focal-length image-taking lens system that forms an optical image of an object at a variable magnification and an image sensor that receives the optical image in a rectangular image-sensing region and then converts the optical image into an electrical signal, it is preferable, as described previously, that the last lens element be given a non-circular outer shape that fulfills conditional formula (1) above, and in addition that the image-taking lens system include a reflective optical element for bending the light path and moreover fulfill conditional formula (3) below. In a case where, as in the first and second embodiments, a variable-magnification optical system such as a zoom lens system is used as an image-taking lens system, the higher the zoom ratio, the more difficult it is to make the image-taking lens unit slim. Thus, in a case where a high-zoom-ratio variable-magnification optical system that fulfills conditional formula (3) is used as an image-taking lens system, the above-mentioned benefits of slimming down the image-taking lens unit are more notable.

$$3 \leq ft/fw \tag{3}$$

where fw represents the focal length of the entire image-taking lens system at the wide-angle end; and ft represents the focal length of the entire image-taking lens system at the telephoto end.

In both the first and second embodiments, the zoom lens system ZL includes only refractive lens elements, that is lens element that deflect the rays incident thereon by refraction (that is lens elements in which light is deflected at the interface between two media having different refractive indices). Any of those lens elements, however, may be replaced with a lens element of any other type, for example: a diffractive lens element, which deflects the rays incident thereon by diffraction; a refractive-diffractive hybrid lens element, which deflects the rays incident thereon by the combined effect of refraction and diffraction; or a gradient index lens element, which deflects the rays incident thereon with a refractive index distribution within a medium. A gradient index lens element, however, requires that its refractive index be varied within a medium and thus requires a complicated production process. Thus, using a gradient index lens element leads to higher cost. To avoid this, it is preferable to use lens elements made of a material having a uniform refractive index distribution. The zoom lens system ZL includes, as optical components other than lens elements, an aperture stop ST, and may further include, as necessary, a beam restricting plate (for example, a flair cutter) or the like for cutting unnecessary light. The last lens element does not necessarily have to have an optical power on a paraxial basis so long as it has an aspherical surface.

EXAMPLES

Hereinafter, practical examples of image-taking lens units embodying the present invention will be presented with reference to their construction data and other data. Examples 1 and 2 presented below are numerical examples corresponding respectively to the first and second embodiments, respectively, described above. Thus, the optical construction diagrams (FIGS. 1A, 1B, 2A, 2B, 2C, and 3; and FIGS. 4A, 4B, 5A, 5B, 5C, 6A, and 6B showing the first and second embodiments also show the lens constructions of Examples 1 and 2, respectively.

Tables 1 and 2 show the construction data of Example 1, and Tables 3 and 4 show the construction data of Example 2. In the basic optical construction shown in Tables 1 and 3 (where i represents the surface number), ri (i=1, 2, 3, . . .) represents the radius of curvature (mm) of the i-th surface counted from the object side; di (i=1, 2, 3, . . .) represents the axial distance (mm) between the i-th and (i+1)th surfaces counted from the object side; Ni (i=1, 2, 3, . . .) and vi (i=1, 2, 3, . . .) represent the refractive index (Nd) for the d-line and the Abbe number (vd), respectively, of the optical material that fills the axial distance di. For each of the variable axial distances, that is, those axial distances di that vary with zooming, three values are given, which are the values observed at the wide-angle end (at the shortest-focal-length position) W, at the middle focal length (at the middle-focal-length position), and at the telephoto end (at the longest-focal-length position) T, respectively. Shown together are the values of the focal length f (mm) of the entire system, the f-number FNO, and the whole angle of view 2ω (degrees) as observed at the just mentioned different focal-length positions W, M, and T.

A surface whose radius of curvature ri is marked with an asterisk (*) is an aspherical surface (a refractive optical surface having an aspherical shape, or a surface that exerts a refractive effect equivalent to that exerted by an aspherical surface, or the like). The surface shape of an aspherical surface is defined by formula (AS) below. Tables 2 and 4 also show the aspherical surface data of the aspherical surfaces used in each example. Here, it should be noted that the coefficient of any term that does not appear in the tables equals zero, and that, for all the data, E-n stands for "×10$^{-n}$".

$$X(H) = (C0 \cdot H^2) / \left(1 + \sqrt{1 - \varepsilon \cdot C0^2 \cdot H^2}\right) + \sum (Aj \cdot H^j) \quad \text{(AS)}$$

where

X(H) represents the displacement in the direction of the optical axis AX at the height H (relative to the vertex);

H represents the height in a direction perpendicular to the optical axis AX;

C0 represents the paraxial curvature (=1/ri);

$\varepsilon$ represents the quadric surface parameter; and

Aj represents the aspherical surface coefficient of order j.

Table 5 shows the values corresponding to the conditional formulae as actually observed in each example. Table 6 shows, for Example 1 in comparison with a comparative example, the along-the-axis astigmatic differences (μm) produced when five lines of surface-error astigmatism appear on the last lens surface. The comparative example differs from Example 1 in the curvature of the last lens surface and the axial distance behind it (corresponding to the air-equivalent distance LB from the vertex of the image-side surface of the last lens element to the image surface IM), and the two are the same otherwise, that is, in the lens arrangement and lens materials. Specifically, in the comparative example, the curvature is so optimized as to correct the aberrations resulting from the modification to the axial distance.

TABLE 1

| | Focal Length Position | (W)~(M)~(T) | | |
|---|---|---|---|---|
| | f[mm] | 6.454~10.907~19.361 | | |
| | FNO | 2.80~3.85~5.24 | | |
| Example 1 | 2ω[°] | 60.74~35.85~20.25 | | |

| i | ri[mm] | di[mm] | Ni | vi | Symbol etc. |
|---|---|---|---|---|---|
| 1 | 26.305 | 0.80 | 1.76802 | 49.2 | Gr1(−) |
| 2 | 9.113 * | 1.67 | | | |
| 3 | ∞ | 7.85 | 1.84666 | 23.8 | PR |
| 4 | ∞ | 0.97 | | | |
| 5 | −6.963 | 0.60 | 1.48749 | 70.4 | |
| 6 | 46.119 | 1.28 | 1.84666 | 23.8 | |
| 7 | −30.828 | 11.069~6.035~0.841 | | | |
| 8 | ∞ | 0.10 | | | ST |
| 9 | 7.585 | 2.43 | 1.48749 | 70.4 | Gr2(+) |
| 10 | −61.936 | 0.00 | | | |
| 11 | 7.627 | 2.41 | 1.74330 | 49.2 | |
| 12 | −76.996 | 0.70 | 1.84666 | 23.8 | |
| 13 | 7.372 | 1.096 | | | |
| 14 | 6.914 * | 1.96 | 1.53048 | 55.7 | |
| 15 | 14.642 * | 0.718~1.113~5.107 | | | |
| 16 | 55.976 | 0.700 | 1.80420 | 46.5 | Gr3(−) |
| 17 | 4.654 | 1.70 | 1.71736 | 29.5 | |
| 18 | 10.125 | 3.285~7.923~9.123 | | | |
| 19 | 12.822 * | 2.56 | 1.53048 | 55.7 | Gr4(+) |
| 20 | −19.370 * | 0.81 | | | |
| 21 | ∞ | 1.00 | 1.51680 | 64.2 | PT |
| 22 | ∞ | | | | |

TABLE 2

| Example 1 | Aspherical Surface Data of Surface i (*) | | |
|---|---|---|---|
| | Surface 2 | Surface 14 | Surface 15 |
| $\varepsilon$ | 1.00000 | 1.00000 | 1.00000 |
| A4 | −1.30553E−04 | −1.03887E−03 | 9.61382E−04 |
| A6 | −8.92741E−07 | −8.27444E−05 | −1.00606E−04 |
| A8 | 1.90687E−08 | −3.59425E−06 | |
| A10 | −1.71335E−09 | | |

| | Surface 19 | Surface 20 |
|---|---|---|
| $\varepsilon$ | 1.00000 | 1.00000 |
| A4 | 1.08680E−03 | 2.62317E−03 |
| A6 | −6.85269E−06 | −5.17110E−05 |
| A8 | 2.96434E−08 | |

TABLE 3

| | Focal Length Position f[mm] FNO 2ω[°] | | (W)~(M)~(T) 7.990~19.180~45.212 3.77~5.09~5.20 61.36~25.68~10.98 | | |
|---|---|---|---|---|---|
| Example 2 | | | | | |
| i | ri[mm] | di[mm] | Ni | vi | Symbol etc. |
| 1 | 47.775 | 0.80 | 1.92286 | 20.9 | Gr1(+) |
| 2 | 20.558 | 2.45 | | | |
| 3 | ∞ | 14.00 | 1.88300 | 40.8 | PR |
| 4 | ∞ | 0.10 | | | |
| 5 | 36.725 | 1.91 | 1.63854 | 55.5 | |
| 6 | −42.803 | 0.10 | | | |
| 7 | 21.430 | 1.657 | 1.49700 | 81.6 | |
| 8 | 286.719 | 0.649~7.284~14.915 | | | |
| 9 | −382.266 | 0.80 | 1.77250 | 49.8 | Gr2(−) |
| 10 | 7.035 * | 2.00 | | | |
| 11 | −7.645 | 0.70 | 1.51680 | 64.2 | |
| 12 | 12.557 | 1.502 | 1.84666 | 23.8 | |
| 13 | −59.208 | 11.166~6.008~0.950 | | | |
| 14 | ∞ | 1.000 | | | ST |
| 15 | 7.807 * | 2.332 | 1.58913 | 61.3 | Gr3(+) |
| 16 | −8.642 | 0.700 | 1.83500 | 43.0 | |
| 17 | −24.972 | 5.77 | | | |
| 18 | 9.133 | 3.44 | 1.48749 | 70.4 | |
| 19 | −5.326 | 0.700 | 1.80610 | 33.3 | |
| 20 | 54.405 | 4.24 | | | |
| 21 | −15.211 * | 2.803 | 1.60700 | 27.0 | |
| 22 | −18.730 * | 0.800~9.075~9.769 | | | |
| 23 | 19.006 * | 2.65 | 1.53048 | 55.7 | Gr4(+) |
| 24 | 467.395 * | 3.47 | | | |
| 25 | ∞ | 0.50 | 1.51680 | 64.2 | PT |
| 26 | ∞ | | | | |

TABLE 4

| Example 2 | Aspherical Surface Data of Surface i (*) | | |
|---|---|---|---|
| | Surface 10 | Surface 15 | Surface 21 |
| ε | 1.00000 | 1.00000 | 1.00000 |
| A4 | −6.77992E−05 | −1.29121E−04 | −1.39665E−03 |
| A6 | 9.60588E−07 | 9.18473E−07 | 1.32784E−05 |
| A8 | 4.13441E−08 | −7.27810E−08 | 1.22729E−06 |
| A10 | −4.62627E−09 | 3.06740E−09 | 2.16702E−08 |
| | Surface 22 | Surface 23 | Surface 24 |
| ε | 1.00000 | 1.00000 | 1.00000 |
| A4 | −9.70325E−04 | −3.77574E−05 | 2.99131E−04 |
| A6 | 1.64975E−05 | 8.90186E−06 | 1.06399E−05 |
| A8 | 3.44137E−08 | −1.92777E−06 | −2.72717E−06 |
| A10 | 1.71822E−08 | 4.71924E−08 | 6.27614E−08 |

TABLE 5

| Conditional Formula Values | (1)(1a) | | | (2) | | | (3) |
|---|---|---|---|---|---|---|---|
| | TS (mm) | TL (mm) | TL/TS | LB (mm) | LD (mm) | FN | LD·FN/LB | ft/fw |
| Example 1 | 7 | 8 | 1.14 | 2.756 | 7.2 | 2.8 | 7.3 | 3.0 |
| Example 2 | 10.9 | 19.0 | 1.74 | 4.820 | 9.0 | 3.77 | 7.0 | 5.7 |

TABLE 6

| | Conditional Formula Values (2) | Axial Astigmatic Differences (μm) | |
|---|---|---|---|
| | LD·FN/LB | (W) | (T) |
| Example 1 | 7.3 | 0.6 | 0.6 |
| Comparative Example | 2.9 | 2.8 | 2.7 |

What is claimed is:

1. An image-taking lens unit comprising:

an image-taking lens system that forms an optical image of an object; and an image sensor that receives the optical image in a rectangular image-sensing region and converts the optical image into an electrical signal, wherein the image-taking lens system includes a reflective optical element that bends an optical path, and wherein, of lens elements constituting the image-taking lens system, a most image-side lens element called a last lens element is molded of resin, and is given a non-circular outer shape fulfilling conditional formula (1) below:

$$1 < TL/TS \qquad (1)$$

where

TS represents a maximum outer dimension in a direction parallel to shorter sides of the image-sensing region; and TL represents a maximum outer dimension in a direction parallel to longer sides of the image-sensing region, wherein conditional formula (1a) below is fulfilled:

$$4/3 < TL/TS \qquad (1a)$$

and wherein conditional formula (2) below is fulfilled:

$$4 \leq LD \cdot FN/LBtm \qquad (2)$$

where

LD represents a diagonal length of the image-sensing region;

FN represents an f-number of the image-taking lens system (a minimum value of the f-number in a case where the f-number varies); and LB represents an air-equivalent distance from a vertex of an image-side surface of the last lens element to an image surface (a maximum value of the distance in a case where the distance varies).

2. An image-taking lens unit comprising:

a variable-focal-length image-taking lens system that forms an optical image of an object at a variable magnification; and an image sensor that receives the optical image in a rectangular image-sensing region and converts the optical image into an electrical signal, wherein, of lens elements constituting the image-taking lens system, a most image-side lens element called a last lens element is given a non-circular outer shape fulfilling conditional formula (1) below, and wherein the image-taking lens system includes a reflective optical element that bends an optical path, and fulfils conditional formula (3) below:

$$1 < TL/TS \qquad (1)$$

$$3 \leq ft/fw \qquad (3)$$

where
TS represents a maximum outer dimension in a direction parallel to shorter sides of the image-sensing region;
TL represents a maximum outer dimension in a direction parallel to longer sides of the image-sensing region;
fw represents a focal length of the entire image-taking lens system at a wide-angle end; and
ft represents a focal length of the entire image-taking lens system at a telephoto end,
wherein conditional formula (1a) below is fulfilled:

$$b\ 4/3 < TL/TStm \qquad (1a)$$

and wherein conditional formula (2) below is fulfilled:

$$4 \leq LD \cdot FN/LB \qquad (2)$$

where
LD represents a diagonal length of the image-sensing region;
FN represents an f-number of the image-taking lens system (a minimum value of the f-number in a case where the f-number varies); and
LB represents an air-equivalent distance from a vertex of an image-side surface of the last lens element to an image surface (a maximum value of the distance in a case where the distance varies).

3. An image-taking apparatus comprising an image-taking lens unit, the image-taking lens unit comprising:
an image-taking lens system that forms an optical image of an object; and
an image sensor that receives the optical image in a rectangular image-sensing region and converts the optical image into an electrical signal,
wherein the image-taking lens system includes a reflective optical element that bends an optical path, and
wherein, of lens elements constituting the image-taking lens system, a most image-side lens element called a last lens element is molded of resin, and is given a non-circular outer shape fulfilling conditional formula (1) below:

$$1 < TL/TStm \qquad (1)$$

where
TS represents a maximum outer dimension in a direction parallel to shorter sides of the image-sensing region; and
TL represents a maximum outer dimension in a direction parallel to longer sides of the image-sensing region,
wherein conditional formula (1a) below is fulfilled:

$$4/3 < TL/TS \qquad (1a)$$

wherein conditional formula (2) below is fulfilled:

$$4 \leq LD \cdot FN/LB \qquad (2)$$

where
LD represents a diagonal length of the image-sensing region;
FN represents an f-number of the image-taking lens system (a minimum value of the f-number in a case where the f-number varies); and
LB represents an air-equivalent distance from a vertex of an image-side surface of the last lens element to an image surface (a maximum value of the distance in a case where the distance varies).

4. An image-taking apparatus comprising an image-taking lens unit, the image-taking lens unit comprising:
a variable-focal-length image-taking lens system that forms an optical image of an object at a variable magnification; and
an image sensor that receives the optical image in a rectangular image-sensing region and converts the optical image into an electrical signal,
wherein, of lens elements constituting the image-taking lens system, a most image-side lens element called a last lens element is given a non-circular outer shape fulfilling conditional formula (1) below, and
wherein the image-taking lens system includes a reflective optical element that bends an optical path, and fulfils conditional formula (3) below:

$$1 < TL/TS \qquad (1)$$

$$3 \leq ft/fw \qquad (3)$$

where
TS represents a maximum outer dimension in a direction parallel to shorter sides of the image-sensing region;
TL represents a maximum outer dimension in a direction parallel to longer sides of the image-sensing region;
fw represents a focal length of the entire image-taking lens system at a wide-angle end; and
ft represents a focal length of the entire image-taking lens system at a telephoto end wherein conditional formula (1a) below is fulfilled:

$$4/3 < TL/TS \qquad (1a)$$

and wherein conditional formula (2) below is fulfilled:

$$4 \leq LD \cdot FN/LB \qquad (2)$$

where
LD represents a diagonal length of the image-sensing region;
FN represents an f-number of the image-taking lens system (a minimum value of the f-number in a case where the f-number varies); and
LB represents an air-equivalent distance from a vertex of an image-side surface of the last lens element to an image surface (a maximum value of the distance in a case where the distance varies).

* * * * *

UNITED STATES PATENT AND TRADEMARK OFFICE
CERTIFICATE OF CORRECTION

PATENT NO. : 7,458,735 B2
APPLICATION NO. : 11/253350
DATED : December 2, 2008
INVENTOR(S) : Yoshihito Souma, Yasushi Yamamoto and Tsutomu Honda It is certified that error appears in the above-identified patent and that said Letters Patent is hereby corrected as shown below:

Column 16:
line 39, delete " $4 \leq LD \cdot FN / LBtm$ (2) " and insert -- $4 \leq LD \cdot FN / LB$    (2) --.

Column 17:
line 11, delete " $b\ 4/3 < TL / TStm$ (1a) " and insert -- $4/3 < TL / TS$    (1a) --.

Column 17:
line 40, delete " $1 < TL / TStm$ (1) " and insert -- $1 < TL / TS$    (1) --.

Signed and Sealed this

Twentieth Day of January, 2009

JON W. DUDAS
*Director of the United States Patent and Trademark Office*